United States Patent Office 3,505,497
Patented Apr. 7, 1970

3,505,497
REPROGRAPHIC APPARATUS HEATER UNIT CONTROL
Louis Frederick William Lawes, Walton-on-Thames, Nicholas Gilbert Shreeve, Weybridge, and Nandor Mihalik, Walton-on-Thames, England, assignors to Arlside Limited, Maidenhead, Berkshire, England, a British company
Filed Apr. 27, 1967, Ser. No. 634,334
Claims priority, application Great Britain, Apr. 28, 1966, 18,684/66
Int. Cl. H05b 1/02
U.S. Cl. 219—216                    3 Claims

ABSTRACT OF THE DISCLOSURE

The invention provides reprographic apparatus including a heater unit, which includes an electrically energisable heater element, and means for advancing a sheet of material, bearing a heat-fixable image of a copied original, to and through the heater unit to fix said image, wherein the heater unit is provided with a temperature-sensitive switch arranged to sense the temperature within the heater unit and to provide regulation of said temperature by regulating the supply of electrical energy to said heater element.

---

This invention relates to a heater or fuser unit for or in reprographic apparatus and to control means for such a unit.

Preferably the temperature-sensitive switch is connected in series with the heater element and with a further switch which may be a main on-off switch of the apparatus or may be a switch disposed in the path of a document to be copied, to be actuated by asid document as it is fed into the apparatus.

CROSS-REFERENCE

A similar heater or fuser unit (but without any thermostatic control) is disclosed in co-pending application S.N. 549,606, filed May 12, 1966 by the same applicants, in which it is suggested that, to minimise the generation of unwanted heat which tends to be dissipated to other parts of the apparatus, the heater or fuser unit should be energised only during and immediately before the passage through it of a sheet of paper or the like bearing a powder image which is to be heat-fused in the heater or fuser unit and thereby fixed permanently on the sheet. The heater unit disclosed in the said co-pending application incorporates a support plate over which the sheet slides as it passes through the heater unit, and it has been found that, if such a support plate of the heater unit is too cool as the image-carrying sheet passes over it while being heated, the difference in the heating effect on the two surfaces of the sheet tends to cause the sheet to curl or buckle. This may result in the sheet becoming jammed or, at the least, in a temporarily less easy handling of the sheet when it is delivered from the apparatus. Furthermore, it has been found that if a sheet of paper is passed under the heaters and over a cool surface, the moisture inherent in the paper is caused to migrate to form damp patches, on which the powder image will not fuse, and that the damp patches condense on the cool surface, leaving "puddles" which cause serious interference with subsequent operations.

Accordingly, it is found desirable to arrange that the heater unit shall be energised for a sufficient time, before a sheet of copy paper enters it, to ensure that all those parts of the heater unit to which the copy paper will be exposed, and notably the aforementioned support plate, will be at an adequate temperature so that any tendency of the copy paper to curl or buckle will be minimised. With a view to minimising this preheating period, it is advantageous to make that surface of the support plate which is exposed to heat from the heat source or sources of the heater unit dark in colour and non-reflective, thereby increasing the rate at which the support plate absorbs heat before the advancing copy paper covers it.

The length of the preheating period required for the support plate to achieve a given desired temperature will in general the variable, dependent for example on ambient air temperature and the temperature of the support plate at the beginning of the preheating period; and it is therefore preferred to provide a preheating period which will be long enough for any conditions likely to be encountered and to arrange that when the desired temperature has been achieved it will not be exceeded before entry of the advancing copy paper into the heater unit. This is achieved by providing the heater unit with thermostatic control, preferably in combination with a heater element which is capable of heating the unit rapidly to the desired temperature.

Preferred embodiments of the invention are described in more detail below, with reference to the accompanying drawings in which.

Figure 1:
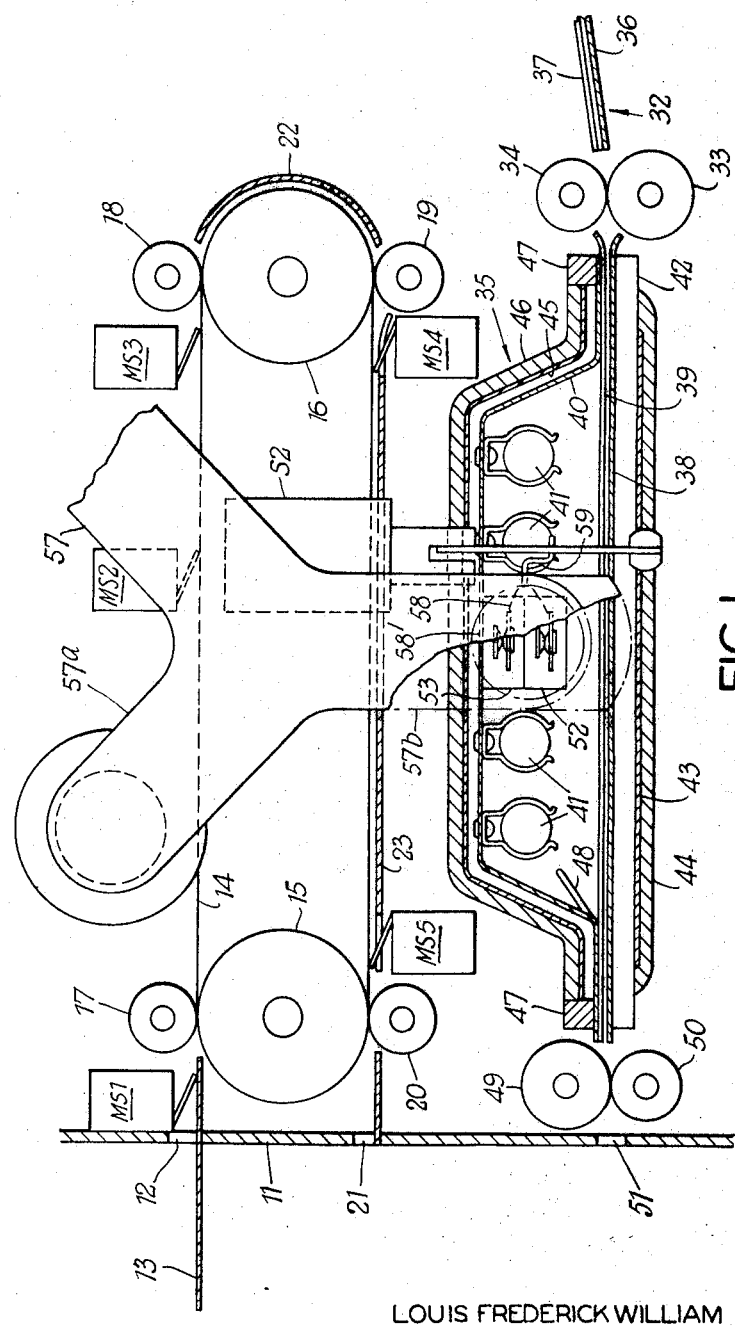
FIGURE 1 is a longitudinal sectional view through part of a reprographic machine embodying the invention, showing the heater or fuser unit thereof and transport means for an original document to be copied.

In FIGURE 1, 11 is a front wall of the illustrated machine and is formed with an aperture 12, provided with a feed table 13, for feeding into the machine an original document which is to be copied. Aligned with the feed table 13 is the upper run of an endless band 14 which is supported by rollers 15 and 16 of which at least one is driven by a main drive of the machine whenever the machine is switched on. Four pinch rollers 17, 18, 19 and 20 are pressed into engagement with the band 14 by spring means (not shown) so as to rotate therewith. Thus a document fed into the machine through the aperture 12 enters the nip between the band 14 and roller 17 and is there gripped to be fed, with the band, until its leading edge is gripped in turn between the band 14 and the rollers 18, 19 and 20, whereafter the document is fed out of the machine through an aperture 21 in the front wall 11. A fixed curved guide 22 guides the leading edge of the document from the roller 18 to the roller 19, and a further fixed guide 23 supports the leading edge of the document as it is advanced from the roller 19 to the roller 20.

Figure 3:
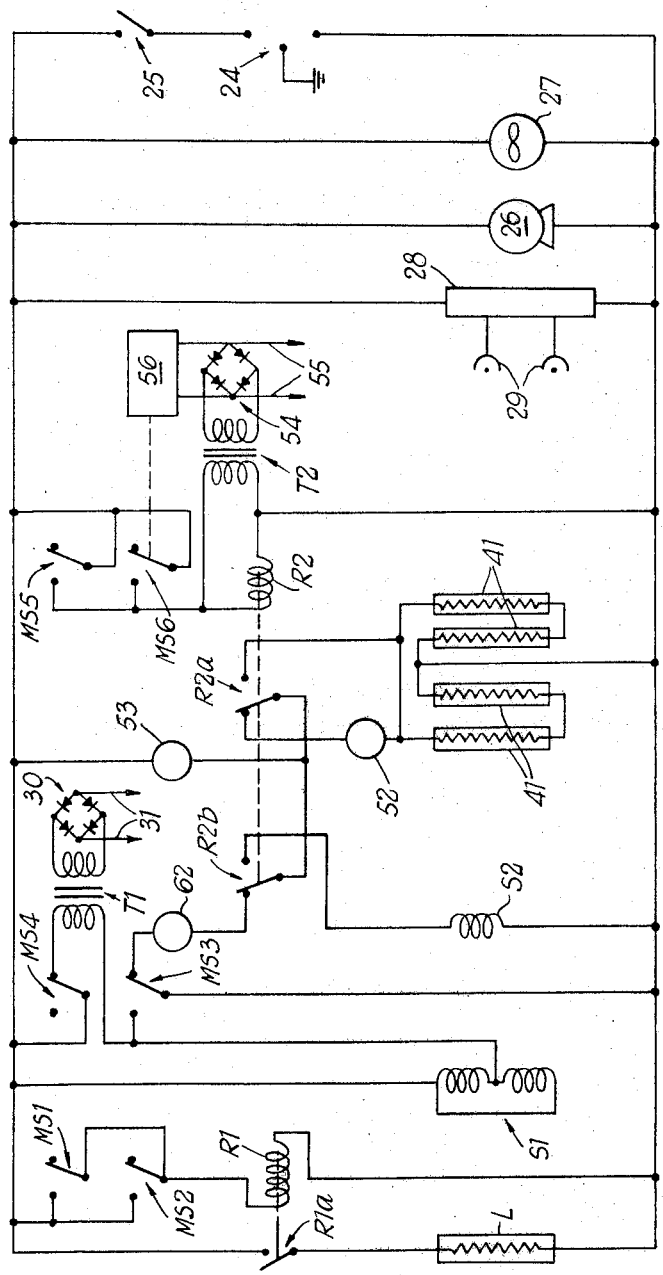
FIGURE 3 is an electrical circuit diagram referring to the machine.

As the document is inserted through the aperture 12 and advanced by the band 14, it trips each in turn of five microswitches MS1, MS2, MS3, MS4 and MS5, which are shown in both FIGURES 1 and 3. As shown in FIGURE 3, the electrical circuit of the machine comprises a plug or socket 24 for connection to an electrical main supply, and a main switch 25 of the machine. When the switch 25 is closed, a main drive motor 26 of the machine is energised, and this drives, inter alia, the band 11. Also energised is a fan 27, for an air-ventilating system further described below, and means 28 for providing a high voltage to corona-discharge devices 29 of the machine. As the document to be copied is inserted through the aperture 12, the microswitch MS1 is closed to energise a relay R1 which closes a switch R1a and energises a lamp L (not shown in FIGURE 1) which illuminates the document as it passes between the roller 17 and the microswitch MS2. This latter switch is in parallel with the switch MS1 and keeps the lamp L illuminated until the trailing edge of the document passes the microswitch MS2, when the relay R1 becomes de-energised and the switch R1a opens. While the lamp L is energised, the illuminated part of the moving document is imaged, by an optical system (not shown), on the moving surface of a light-sensitive drum (not shown) of the machine, the drum being driven at appropriate speed by the main drive from the motor 26. In known manner, each part of the drum surface is electrostatically charged, prior to having a part of the document imaged on it, by one of the corona-discharge devices 29; and the incidence of the light image causes the drum to record an electrostatic image of the document. When the leading edge of the document trips the microswitch MS3, at the appropriate time as determined by the position of this switch relative to the band 14, a solenoid S1 becomes energised and opens a shutter of a toner or developer unit (not shown) of the machine, to allow developer therefrom to cascade over the drum surface; the solenoid S1 remains energised until the trailing edge of the document passes the switch MS3, and developer accordingly cascades over at least a corresponding peripheral length of the moving drum, to develop the whole of the electrostatic image of the document.

Tripping of the switch MS3 also makes a first connection in the primary circuit of a transformer T1, and when the leading edge of the document trips the switch MS4 this transformer becomes energised and provides, through a rectifier assembly 30, a D.C. supply on leads 31 to actuate a copy-paper feed mechanism (not shown) which advances a sheet of copy paper from a stack (not shown) into engagement with copy-paper transport means (not shown) which transports the sheet of copy paper to the drum for transfer, in known manner and with the aid of the other of the corona-discharge devices 29, of the developed image from the drum to the copy paper. The copy-paper feed mechanism is only required to act for a short time (until the sheet of copy paper is engaged by the copy-paper transport means), and becomes de-energised when the trailing edge of the document being copied passes the switch MS3 and allows it to break the circuit for the transformer T1.

The copy paper, to which the developed image is transferred, is stripped from the drum and fed along a guide or chute 32 (see FIGURE 1) to the nips between a roller 33 driven by the main drive of the machine and a pair of rollers 34 co-operating with opposite ends of the roller 33 so as to engage the edges of the copy paper and feed it, without touching the part of its upper surface which carries the transferred image, to a heater unit 35. The guide 32 comprises a flat supporting plate 36, on which the copy paper slides, and lateral guide strips 37 slightly spaced above the edges of the plate 36 and overlying the edges of the copy paper thereon so as to maintain the copy paper flat without touching the part of the upper surface thereof on to which the developed image has been transferred.

Figure 2:
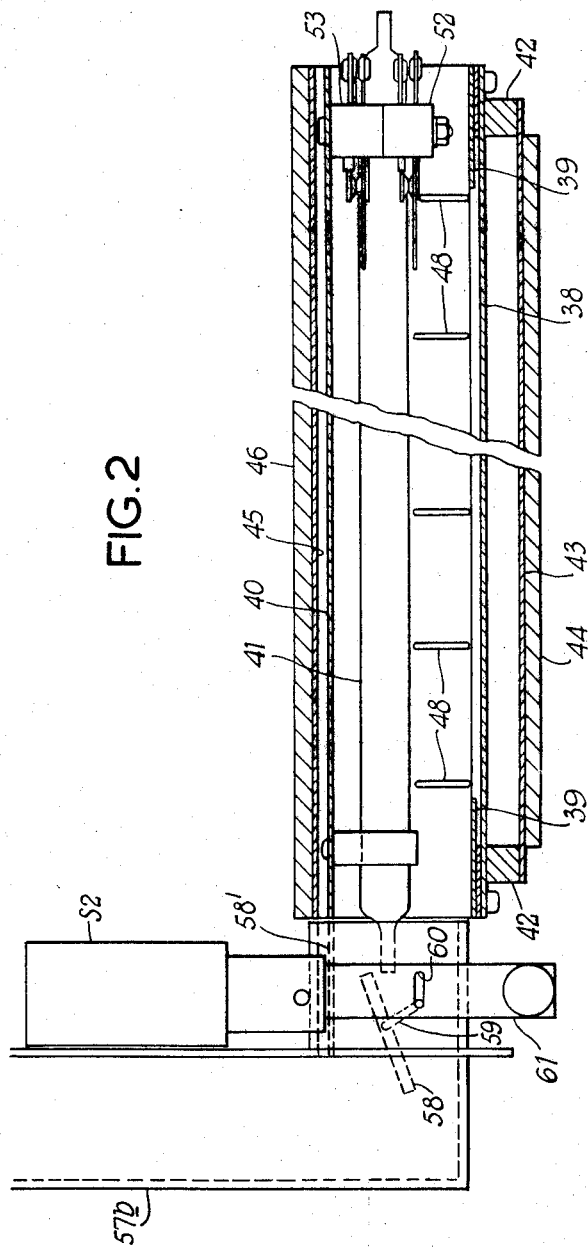
FIGURE 2 shows a transverse sectional view through the heater unit shown in FIGURE 1.

The heater unit 35, shown in FIGURES 1 and 2, is generally as disclosed in the above-mentioned co-pending application S.N. 549,606. It comprises a support plate 38 on which the copy paper slides as it is advanced by the rollers 33 and 34, lateral guide strips 39 similar to the guide strips 37 of the chute 32 and serving a similar purpose, and an upper reflector 40 on which are mounted four heater elements 41. The plate 38 is stiffened by bars 42 to minimise any tendency to buckling under the effect of heat, and an underplate 43 is provided with a layer 44 of heat-insulating material. Spaced above the reflector 40 is a backing shield 45 which is similarly provided with a layer 46 of heat insulating material. The ends of the reflector 40, to which the ends of the guide strips 39 are secured, are stiffened by bars 47 which also serve to locate the backing shield 44 and the insulating layer 45 thereon. At the exit end of the heater unit, the reflector 40 is fitted with tines 48 extending obliquely upwardly to flatten the advancing leading end of the copy paper if this should have become buckled by heat during its passage through the heater unit. As the copy paper, advanced by the rollers 33 and 34, emerges from the heater unit its leading edge enters the nip between a pair of rollers 49 and 50, of which one is driven by the main drive of the machine, and these feed the copy paper out of the machine through an aperture 51 in the front wall 11 thereof.

As shown in FIGURE 3, the four heater elements 41 of the heater unit are connected in pairs in series, with the two pairs in parallel with one another, and in series with all of them and with one another are connected two thermostats 52 and 53 mounted at one side of the heater unit, as shown in FIGURES 1 and 2. The connection between the two thermostats is through a switch R2a, in the normal position thereof, but when this switch is actuated, which occurs when a controlling relay R2 is energised, the thermostat 52 is by-passed. The thermostat 52 is set to open and close at upper and lower temperatures which are close together and respectively above and below some temperature (say 80° C.) which is suitable as the initial temperature of the heater unit before a sheet of copy paper enters it. The thermostat 53, on the other hand, is merely a safety or emergency switch and normally remains closed; it may be set to open at, say, 125° C. and to remain open until the temperature has fallen substantially, say to 40° C. Accordingly, as soon as the machine is switched on, by means of the main switch 25, the elements 41 are energised and heat up the heater unit to about 80° C., which temperature is thereafter maintained by means of the thermostat 52. Conveniently, each of the elements 41 is an infra-red heater element which would deliver 850 watts if connected individually across the mains supply. Thus the four elements connected as illustrated, together deliver about 850 watts; but they constitute a more widely distributed source of heat than a single element would do, and each is operating at lower temperature than normal and is therefore delivering relatively more infra-red radiation and relatively less visible light.

The relay R2 is controlled, initially, by the switch MS5, which is positioned to be tripped, by the leading edge of the document being copied, at an appropriate time just before the leading edge of the copy paper enters the heater unit. When the switch MS5 is tripped, the relay R2 becomes energised and actuates the switch R2a to by-pass the thermostat 52. From that moment, the heater elements (whether or not they were previously energised, depending on the thermostat 52) are energised continuously. In parallel with the relay R2, and therefore energised simultaneously therewith, is a transformer T2 which, through a rectifier assembly 54, supplies power through leads 55 to a magnetic clutch not shown for applying the main drive to drive a drum-cleaning device (not shown) and to a toner-replenishing unit (not shown) associated with the developer unit (not shown) to which reference was made above. The transformer T2 and rectifier assembly 54 also supply power to a timer 56 which, therefore, trips a microswitch MS6, in parallel with the switch MS5, as soon as this latter switch is tripped. The relay R2 therefore remains energised for a predetermined interval (during which the trailing edge of the document being copied passes the switch MS5 and releases it) which is long enough for the whole length of the copy paper, including its trailing edge, to pass right through the heater unit. When the timer 56 allows the switch MS6 to revert to its initial condition the timer, the drum-cleaning device and the replenisher unit become inoperative, and the relay R2 becomes de-energised and allows the thermostat 52 once more to control the temperature within the heater unit. The air supplied by the fan 27 is fed through a branched duct 57 (see FIGURES 1 and 2) partly through a branch 57a to the vicinity of the lamp L, to prevent it from becoming overheated, and partly through a branch 57b to one side of the heater unit through which the air then passes transversely to be discharged at the other side, past the thermostats 52 and 53. Entry of the air into the heater unit is conrolled by means of a butterfly valve 58 actuated by a solenoid S2. When closed, the valve 58, shaped as a major segment of a circle, shuts off the supply of air to the space between the reflector 40 and the support plate 39; but the remaining minor segment of the circular-section part of the branch 57b in which the valve 58 is located remains permanently open to supply air at all times to the space between the reflector 40 and the backing shield 45. To ensure the separation of these air supplies there is provided within the branch 57b a dividing plate 58', aligned with the reflector 40, with which the upper edge of the valve 58 co-operates when closed. The valve 58 is provided with a crank 59, the end of which engages in a slot 60 in a weighted rod 61 pivotally carried by the armature of the solenoid. The valve 58 is normally open but closes when the solenoid is energised, to cut off the supply of air to the main space within the heater unit. The solenoid is energised, through the cut-out thermostat 53, in dependence on the relay R2 which controls a switch R2b for the purpose. Thus the air is supplied to the main space within the heater unit whenever the heater elements are under thermostatic control and is shut off whenever the thermostatic control is by-passed.

The switches MS3 and R2b are also used to control an indicator lamp 62 which, when lit, indicates that a document to be copied may be fed into the machine. This lamp is switched off by the switch MS3 as a document to be copied is fed into the machine, remains off when the trailing edge of the document frees the switch MS3, because by then the leading edge has tripped the switch MS5 and the relay R2 is energised, and lights again when the timer 56 allows the relay R2 to become de-energised. Thus, if the lamp 62 is obeyed, there will always be an interval between the relay R2 becoming de-energised after the making of one copy and becoming energised again during the making of another copy, and during this interval the heater unit temperature will be restored under thermostatic control to its designed initial value, thus safeguarding against a progressive temperature rise to an overheated state.

It may be noted that the above-described preheating of the support plate 38 of the heater unit to an adequate initial temperature not only minmises the tendency of the copy paper to curl or buckle due to differential heating on its two sides but also ensures that moisture expelled from successive sheets of copy paper as they are heated will not condense and collect on the support plate. Such collected moisture would tend to prevent later sheets of copy paper coming in contact with it from being evenly heated to a sufficient temperature to fix the image which they carry, and this could lead to incomplete or patchy fixing of such images. As previously mentioned, it is found preferable to make the upper surface of the support plate 38, which is exposed to radiation from the heating elements 41, non-reflective and dark in colour so that it absorbs a considerable part of the radiation incident on it.

It will be understood that although the control circuitry of the above described embodiment of the invention employs microswitches, these might within the scope of the invention be replaced by other mechanically actuated switches or by proximity switches such as a light beam and photocell arrangement controlling a relay, which involves no mechanical contact. Equally, variations of the circuitry are permissible; for example, the switch MS1 might be arranged to actuate a suitable timer, like the timer 56, and the switch MS2 would then be omitted. Furthermore, although in the illustrated embodiment the timing of the various operations within the machine is effected entirely in dependence on the progress of the document to be copied, some of these operations could, if desired, be time-controlled in dependence on the progress of the copy paper. Or, again, entry of the document to be copied could be arranged to start a timer which thereafter would control all the operations of the machine, with appropriate timing of each but without any further actual sensing of the position or progress of either the document being copied or the copy paper.

Figure 4:
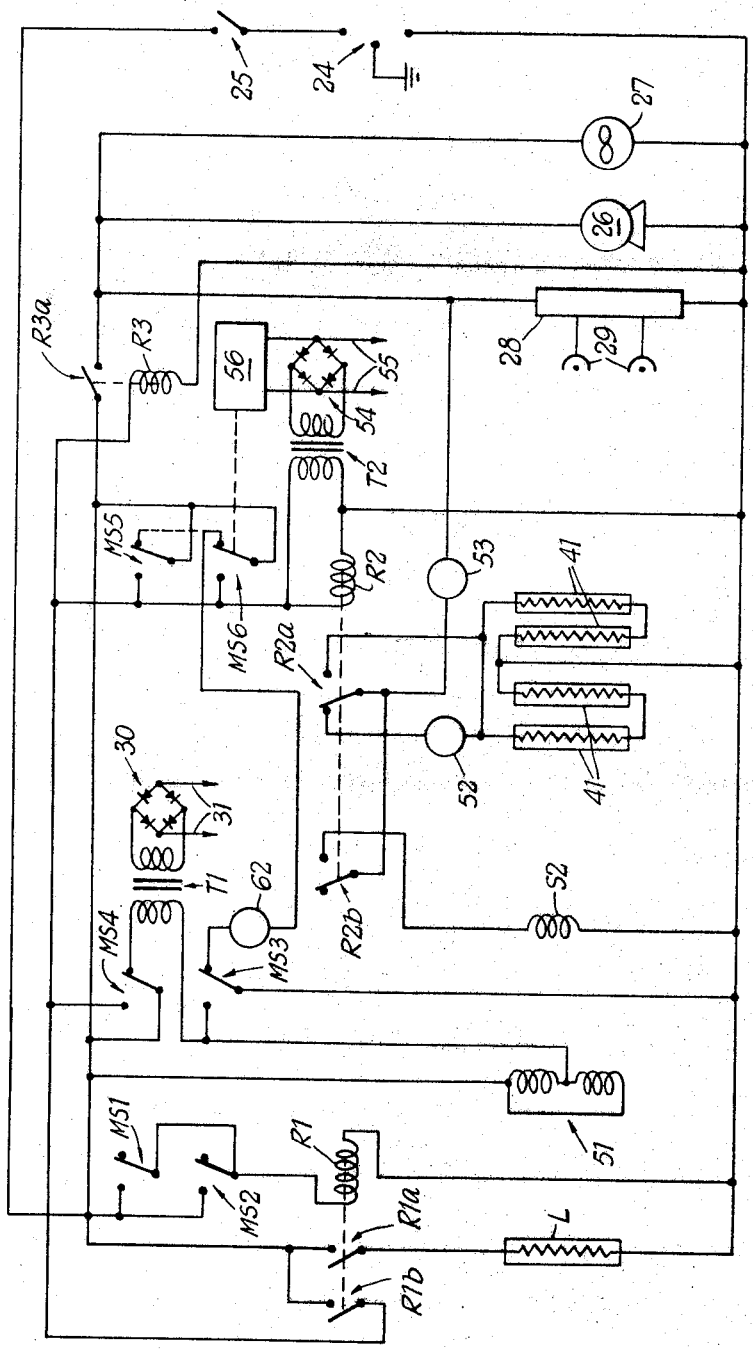
FIGURE 4 is an electrical circuit diagram similar to that shown in FIGURE 3 but including modifications.

Because the heater unit as described above is under thermostatic control, it is practicable to arrange that it should be supplied with power at relatively high rate so that it achieves the required temperature relatively quickly. In particular, it becomes possible for the required temperature to be achieved during the relatively short interval between the insertion into the machine of the leading edge of a document which is to be copield and the arrival at the heater unit of the leading edge of the copy paper. Accordingly, it is unnecessary to wait, after closing the switch 25, before inserting the document which is to be copied. It is therefore practicable to modify the circuit shown in FIGURE 3 in such manner that the machine is switched on by the leading edge of the document to be copied, as this is inserted into the machine. One suitable modification of the circuit shown in FIGURE 3, to provide this effect, is shown in FIGURE 4.

The circuit shown in FIGURE 4 differs from that shown in FIGURE 3 only as follows:

(i) The main switch 25 is connected to the motor 26, fan 27, corona-discharge device 28 and cut-out thermostat 53 not directly but through a switch R3a controlled by a relay R3.

(ii) The indicator lamp 62 is connected to the switch 25 through the switch MS6 and not through the switch R2b and thermostate 53.

(iii) The relay R3 is connected to be controlled, in parallel, by the switches MS4, MS5 and MS6 and by an additional switch R1b with which the relay R1 is provided.

It will be apparent that closing the main switch 25 does not energise any part of the machine except the indicator lamp 62 which becomes illuminated to indicate that a document to be copied may be fed into the machine. When this is done, tripping the switch MS1, the consequent energisation of the relay R1 energises not only the lamp L through the switch R1a but also the relay R3 through the switch R1b, thus energising the motor 26, the fan 27, the corona-discharge device 28 and the heater elements 41 through the thermostats 52 and 53. The relay R3 remains energised, and the subsequent operation of the machine is the same as with the circuit shown in FIGURE 3, until the timer 56 allows the switch MS6 to break the circuit for the relay R3; for, until that occurs, a circuit for the relay R3 is made, continuously, first through the switch R1b while the switch MS1 and/or MS2 is energised, then through the switch MS4 (at which the leading edge of the document being copied arrives before its trailing edge arrives at the switch MS2), and then through the switch MS5 and/or MS6. At the end of the period timed by the timer 56, all parts of the machine become inoperative except the lamp 62 which becomes illuminated to indicate that a further document to be copied may be inserted. The lamp 62 could, if desired, be connected to the unused terminal of the switch MS5, as indicated by a broken line, instead of to the switch MS6. It would then indicate, *before* the machine became switched off, that a further copy could be made; and thus a succession of copies could be made with the machine running continuously. This modification would reduce the interval during which the heater unit is under thermostatic control between one sheet of copy paper and the next passing through it, but this interval could still be arranged to be adequate to prevent a gradual heat build-up during continuous copying.

Finally, it may be noted that the drum-cleaning device referred to in the foregoing description may be in accordance with co-pending application S.N. 501,319, filed Nov. 29, 1965, or with British patent application No. 51,586/65, and the developer unit and toner replenisher unit referred to may be in accordance with co-pending application S.N. 554,591, filed June 1, 1966—the times when the shutter of the developer unit is held open by the solenoid S1 and when the replenisher unit is made operative by energisation from the leads 55 being, however, not coincident but being determined as described above.

It will, of course, be understood that this invention is not limited to the combinations described in detail above. It is equally intended that it should be possible if so desired to cause the pre-heating operation to be activated by a selected micro-switch, which could for example also be the switch MS1 in the first example, so that although the machine drive, E.H.T. supply and so on is switched on by the main switch, the fusing station is not activated until an actual copy is required. Other arrangements are equally feasible, as for example, by using an additional micro-switch, or by using one of the other existing micro-switches described, or operating off an independent timing device which could be initiated on feeding in an original.

What we claim is:

1. Reprographic apparatus which includes in combination:
    a heater unit comprising an electrically energisable heater element and a support plate having exposed to said heater element a support surface which is dark in color and is poorly reflective,
    means for advancing to and through said heater unit, over said support surface thereof, a sheet of material having a heat-flexible image,
    means for blowing a stream of air through the heater unit, and
    an energising circuit for said heater element, said circuit including, in series with said heater element, a first temperature-sensitive switch positioned in the path of said stream of air as it issues from the heater unit and arranged to open and close as the temperature which it senses rises above and falls below, respectively, a preselected range of temperature suitable for fixing said image, and a second temperature-sensitive switching also positioned in the path of said stream of air as it issues from the heater unit and arranged to open and close as the temperature which it senses rises above and falls below, respectively, a second temperature range which includes, and extends both above and below, said preselected temperature range.

2. Reprographic apparatus as claimed in claim 1 and further including: means for transporting an original document along a defined path during copying thereof; a first switch means arranged to be actuated by said document during said transport thereof and connected to initiate said means for advancing said sheet of material to and through said heater unit; and a second switch means also arranged to be actuated by said document during said transport thereof and connected to close, when so actuated, said energising circuit for supply of heater current to said heater element under control of said temperature-sensitive switches; said first and second switch means being so positioned relative to said defined path that said energising circuit becomes closed sufficiently long before arrival of said sheet at said heater unit to ensure that upon such arrival the temperature within the heater unit will be within the said pre-selected range of temperature.

3. Reprographic apparatus as claimed in claim 1 and further including: means for transporting an original document to be copied along a defined path during copying thereof; a first switch means arranged to be actuated by said document during said transport thereof and connected to initiate said means for advancing said sheet of material to and through said heater unit; blocking means for blocking said stream of air, at least partially during passage of said sheet through the heater unit; bypass means for bypassing said first temperature-sensitive-switch; and further switch means arranged to be actuated by said document to be copied during transport thereof and approximately as said sheet arrives at the heater unit, and upon being so actuated to render operative said blocking means and said bypass means.

References Cited

UNITED STATES PATENTS

| | | | |
|---|---|---|---|
| 794,580 | 7/1905 | Ayer | 219—518 X |
| 3,096,424 | 7/1963 | Cecchini | 219—508 X |
| 3,202,818 | 8/1965 | Thomiszer | 219—216 X |
| 3,219,794 | 11/1965 | Mindell et al. | 219—216 |
| 3,219,799 | 11/1965 | Trumbull et al. | 219—388 |
| 3,398,259 | 8/1968 | Tregay et al. | 219—216 |

JOSEPH V. TRUHE, Primary Examiner

P. W. GOWDEY, Assistant Examiner